(12) United States Patent
Jelten et al.

(10) Patent No.: US 6,575,180 B2
(45) Date of Patent: Jun. 10, 2003

(54) SPA FILTER CLEANING AND RINSING DEVICE

(76) Inventors: Jeffery A. Jelten, 920 Capitola Ave., #56, Capitola, CA (US) 95010; Sean E. Camp, 908 Tower Pl., Santa Cruz, CA (US) 95060

( * ) Notice: Subject to any disclaimer, the term of this patent is extended or adjusted under 35 U.S.C. 154(b) by 80 days.

(21) Appl. No.: 09/858,970

(22) Filed: May 16, 2001

(65) Prior Publication Data

US 2002/0170585 A1 Nov. 21, 2002

(51) Int. Cl.[7] ................................................. B08B 3/02
(52) U.S. Cl. ....................... 134/138; 134/152; 134/198; 134/900; 239/600
(58) Field of Search ................................ 134/137, 138, 134/900, 198, 152; 239/600; D32/1, 25

(56) References Cited

U.S. PATENT DOCUMENTS

| | | | | |
|---|---|---|---|---|
| 2,194,607 A | * | 3/1940 | McDevitt | |
| 3,325,395 A | * | 6/1967 | Ferrari | |
| 3,442,273 A | * | 5/1969 | Hanish et al. | |
| 3,577,280 A | * | 5/1971 | George | |
| 3,602,227 A | * | 8/1971 | Soderberg | |
| 3,606,897 A | * | 9/1971 | Tobin, III et al. | |
| 3,642,013 A | * | 2/1972 | Thierstein | |
| 4,299,245 A | * | 11/1981 | Clapper | |
| 4,585,019 A | * | 4/1986 | Jacobson | |
| 4,995,749 A | * | 2/1991 | Gornik | |
| 5,135,580 A | * | 8/1992 | Cantrell et al. | |
| 5,263,503 A | * | 11/1993 | St. Jean | |
| 5,989,419 A | * | 11/1999 | Dudley et al. | |

\* cited by examiner

*Primary Examiner*—Frankie L. Stinson
(74) *Attorney, Agent, or Firm*—Jeffrey A. Hall

(57) ABSTRACT

A filter cleaning and rinsing device for spas, pools, and Jacuzzi's that attaches to a garden hose for cleaning or rinsing a cartridge type spa filter by placing the filter on an inclining armature of the device. The armature sprays water inside the filter cartridge and is the centrifugally forced out through the fabric elements of the filter by high pressure spray jets trained on the exterior of the filter cartridge which simultaneously clean the exterior and spin the filter around the armature at a high speed creating the centrifugal force. The device may be molded and assembled using the same manufacturing processes as those used to make the spas which utilize cartridge type filters.

5 Claims, 1 Drawing Sheet

SPA FILTER CLEANING AND RINSING DEVICE

BACKGROUND OF THE INVENTION

37 C.F.R. 1.77(a)(7)

1. Field of Invention

This invention relates to filter cleaning devices and more particularly to spa filter cleaning devices for cleaning and rinsing filters of spas, pools, Jacuzzi's and the like.

2. Description of the Related Art

Heretofore, numerous devices have been proposed and implemented for cleaning filters of spas, pools, Jacuzzi's, and the like. Typically spa filters need to be thoroughly cleaned and rinsed out on a regular basis, preferably every week or two. Many spas have multiple filters making this process laborious, time consuming, and messy. Currently available filter cleaning devices require the user to place the filter in an upright position and then spray the filter with the hose to dislodge accumulated debris on the filter. The problem with this approach is that it is usually messy, and the user often gets splattered with water and debris. Another limitation of such method of cleaning filters is that the filter often spins so fast that the centrifugal force forces out the water before it penetrates deeply into the filter element, effectively cleaning only the outer surface.

The present invention is a spa filter cleaning device that may be attached to a garden hose. The spa filter is positioned on an armature of the device, the inside diameter of the filter being larger than the outside diameter of the armature which allows the cartridge to spin freely when water pressure, shooting out from jets which are positioned on the base of the device and aimed at the filter cartridge is applied. The device may either be placed on the ground, where the cartridge will be in a near horizontal position, or hung up perpendicular to the ground where the cartridge is then in a near vertical position.

Accordingly, the present invention provides a novel device which enables a user to easy, quickly, and efficiently clean a filter of a spa, pool, Jacuzzi, or the like comfortably The device of the present invention is portable, lightweight, has no moving parts, inexpensive to manufacture, and highly efficient at cleaning and rinsing filters.

Further objects and advantages include a device which may simply be attached to a garden hose for cleaning and rinsing a cartridge filter of a spa or pool by simply placing the filter over the armature of the device and then turning on the water. No further attention is needed until the filter is thoroughly rinsed and ready to be returned to the spa or pool.

Another object of the invention is to provide a filter cleaning device which eliminates the need for complicated mechanism or moving parts allowing for simplified operation, affordability and longevity.

A further object and advantage is to accomplished by the manufacture of such device using the materials and processes that are standard in the manufacture of spas so that the device may be manufactured as an integral part of the spa or as a separated unit.

A still further object of the invention is to provide an embodiment of the invention which includes a cover element which deflects the spray during operation yet will drain off the dirty water rapidly.

A still further object of the invention is to provide such a device using different lengths and diameters of armatures to accommodate different filter types, and to allow adjustability of the armature to change the angle at which the filter is positioned while being sprayed.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

BRIEF SUMMARY OF THE INVENTION 37 C.F.R. 1.77(a)(8)

The present invention is a filter cleaning and rinsing device for spas, pools, and Jacuzzi's that attaches to a garden hose for cleaning or rinsing a cartridge type spa filter by placing the filter on an inclining armature of the device. Alternatively, the device may be incorporated into a spa as an integral feature thereof. The armature sprays water inside the filter cartridge and is then centrifugally forced out through the fabric elements of the filter by high pressure spray jets trained on the exterior of the filter cartridge which simultaneously clean the exterior and spin the filter around the armature at a high speed creating the centrifugal force. The device may be molded and assembled using the same manufacturing processes as those used to make the spas which utilize cartridge type filters.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DETAILED DESCRIPTION OF THE INVENTION

37 C.F.R. 1.77(a)(10)

Reference will now be made in detail to the present preferred embodiments of the invention as illustrated in the accompanying drawings.

In accordance with the present invention, there is provided a filter cleaning device, comprising, a base, and armature support means for supporting an armature to the base. Spray jet support means, preferably integral with the base support a plurality of spray jets. A water receiving receptacle is secured to the base for securing to a water source such as a garden hose.

Figure 1:
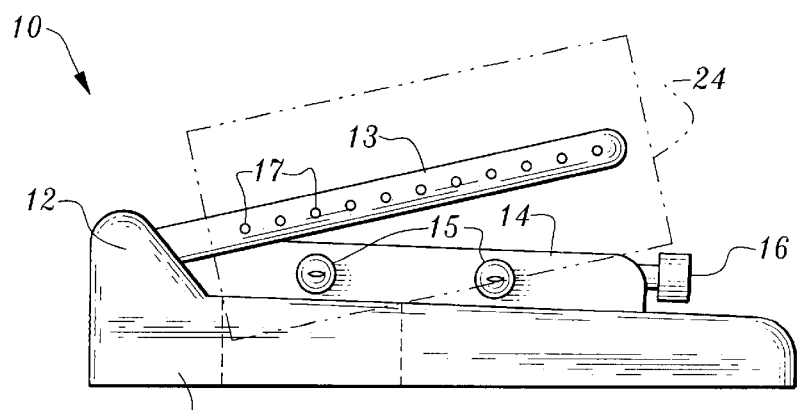
FIG. 1 is a side view of the filter cleaning and rinsing device with a spa cartridge type filter positioned for cleaning, according to the invention.

In FIG. 1, filter cleaning and rinsing device 10, for cleaning and rinsing spa, pool, and Jacuzzi filters, is shown according to a preferred embodiment of the invention. Filter cleaning 10, includes base 11, preferably a single molded piece of plastic with contours. At the head or top of filter cleaning device 10, is contour 12, for supporting armature 13, which preferably extends out from contour 12, at an upward angle so that gravity works to keep a cartridge filter 23, on the device.

Figure 2:
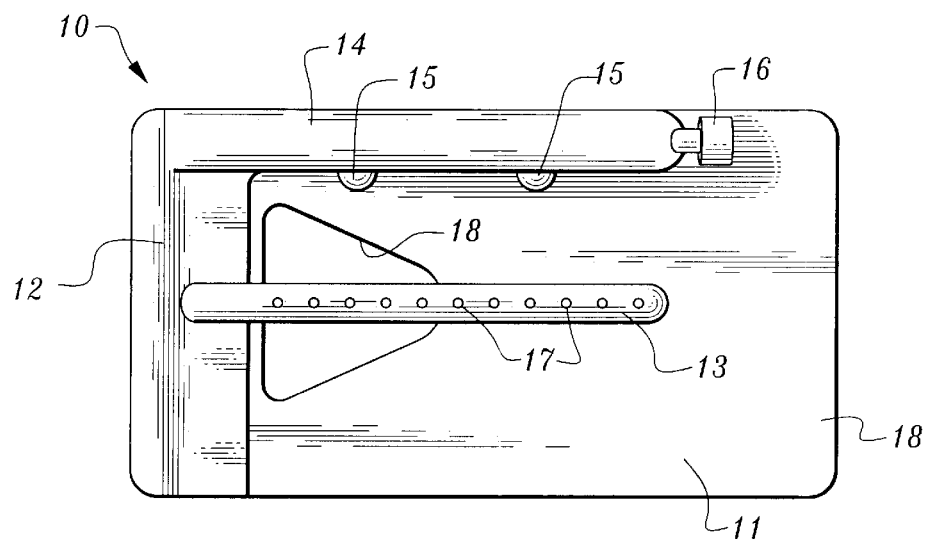
FIG. 2 is a top view of such device, according to the invention.

As seen in FIGS. 1 and 2, a second supporting contour 14, is connected to contour 12, and is preferably integral with base 11. Preferably a plurality of spray jets 15, are secured to contour 14, which are preferably positioned so that the water stream strikes a filter cartridge 24, positioned on armature 13, at an angle so that filter cartridge 24, spins around armature 13.

Preferably, at the end of base 11, opposite to contour 12, is hose receptacle 16, where a water source, such as a garden hose may be attached. Hose receptacle 16, may be positioned in other locations on base 11, or configured to correspond to the plumbing on a spa, so that it may be provided integral therewith.

With reference now to FIG. 2, base 11, is shown with armature support contour 12, with armature 13, operably secured therein. Spray jet supporting contour 14, with spray jets 15, protruding from it and water receptacle 16, protruding from the bottom of contour 14. Water spray holes 17, in armature 13, are provided to fill the inside of spa cartridge filter 24 with water that is then centrifugally forced from the inside of the cartridge filter out by the spinning motion created by spray jets 15, simultaneously striking the outside of the cartridge filter thereby effectively flushing the filter from the inside out. A cutout 18, in base 11, is also seen in FIG. 2, which accommodates the outside diameter of cartridge filter 24, and allows water to readily drain off base 11.

Figure 3:
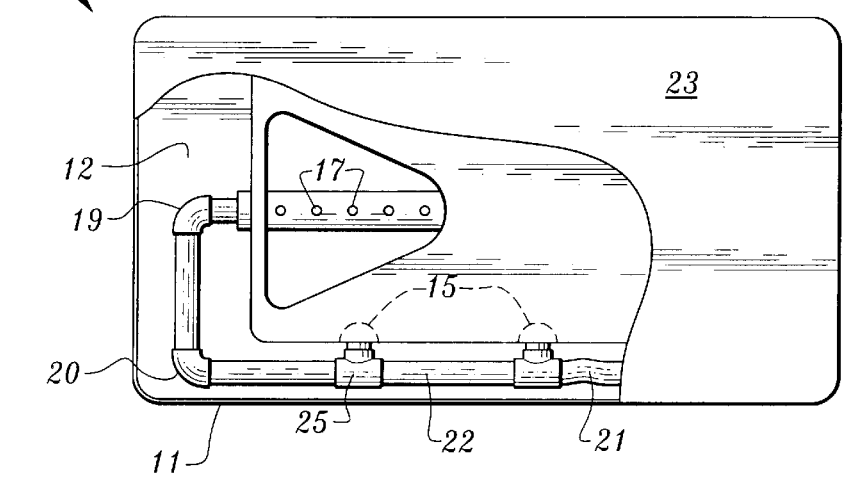
FIG. 3 shows an embodiment of such device including a cover element, according to the invention.

In FIG. 3, the plumbing which channels water to the spray features, namely spray jets 15, on contour 14, and apertures 17, in armature 13. Water enters pipe 22, which may be supplied via water receiving receptacle 16, seen in FIG. 2, preferably at the point where water receiving receptacle 16, passes through spray jet supporting contour 14, immediately entering the T fitting 25, for the first spray jet allowing water to both exit the jet and to continue on through the plumbing and into the second spray jet T fitting 25. The water then enters flexible section 21, of pipe 22, that proceeds around 90 degree armature fitting 20, flowing into armature 13, at connection 19, and out of spray holes 17, in armature 13. A cover 23 element, may be provided, allowing for full operation of filter cleaning and rinsing device 10, while at the same time keeping the spray down to a confined area.

In operation and use, filter cleaning and rinsing device 10, allows for the hands free operation and cleaning of a filter by placing the filter on armature 13, of the device. Water from the spray jets strategically aimed at the outside surface of the filter allow for maximum cleaning and spinning in addition to one or more jets of water spraying inside the filter from apertures 17, in armature 13, thus forcing the water from the inside out through centrifugal force thereby thoroughly rinsing out the filter. The manufacture of the device is preferably done in the same manner as a spa shell, and may utilize waste from the ends and pieces of the sheet of plastic that the spa is formed from and then plumbed in the same manner as a spa is plumbed. This allows for the manufacturer to incorporate a filter cleaning device with each spa, designed to clean the specific filter cartridge used in that spa without the need for the use to make adjustments. Accordingly, this device may be provided as an accessory to a spa, pool or Jacuzzi, or as an integral feature thereof.

As is evident from the above description, a wide variety of filter cleaning devices may be envisioned from the device described herein and additional advantages and modifications will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A portable filter cleaning device, comprising:
    a base;
    armature support means for supporting an armature to said base; said armature support means is a curved raised surface of said base;
    spray jet support means for supporting a plurality of spray jets, said spray jet support means being integral with said base; and
    a water receiving receptacle secured to said base for securing to a water source.

2. A portable filter cleaning device, comprising:
    a base;
    armature support means for supporting an armature to said base;
    spray jet support means for supporting a plurality of spray jets, said spray jet support means being integral with said base; said spray jet support means being a curved surface continuous with said armature support means; and
    a water receiving receptacle secured to said base for securing to a water source.

3. A filter cleaning device for installation in a housing which supports a shell of a modular portable spa, comprising:
    a base;
    armature support means for supporting an armature to said base; said armature support means is a curved raised surface of said base;
    spray jet support means for supporting a plurality of spray jets, said spray jet support means being integral with said base; and
    a water receiving receptacle operably secured to said base for securing to a water source.

4. A filter cleaning device for installation in a housing which supports a shell of a modular portable spa, comprising:
    a base;
    armature support means for supporting an armature to said base;
    spray jet support means for supporting a plurality of spray jets; said spray jet support means being integral with said base; said spray jet support means being a curved surface continuous with said armature support means; and
    a water receiving receptacle operably secured to said base for securing to a water source.

5. A method of manufacture of a filter cleaning device for spas, comprising:
    forming a single piece filter cleaning and rinsing device from plastic,
    plumbing said single piece filter cleaning and rinsing device to correspond to plumbing of a spa; and
    sizing and configuring said single piece filter and cleaning device to operably correspond with a filter cartridge for said spa.

* * * * *